United States Patent
R et al.

(10) Patent No.: US 11,461,166 B2
(45) Date of Patent: Oct. 4, 2022

(54) INTELLIGENT INTEGRATION ERROR HANDLING IN ENTERPRISE SYSTEMS

(71) Applicant: SAP SE, Walldorf (DE)

(72) Inventors: Avinash R, Bangalore (IN); Krithika G, Bangalore (IN); Suharsh Cherukunnon Arippa, Bangalore (IN); Ankita Nandanwar, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/093,963

(22) Filed: Nov. 10, 2020

(65) Prior Publication Data

US 2022/0147414 A1     May 12, 2022

(51) Int. Cl.
G06F 11/00 (2006.01)
G06F 11/07 (2006.01)

(52) U.S. Cl.
CPC ...... *G06F 11/0793* (2013.01); *G06F 11/0709* (2013.01); *G06F 11/0751* (2013.01); *G06F 11/0778* (2013.01)

(58) Field of Classification Search
CPC ............ G06F 11/0793; G06F 11/0709; G06F 11/0751; G06F 11/0778; G06F 11/079; G06F 11/0703; G06F 11/0766
See application file for complete search history.

(56) References Cited

U.S. PATENT DOCUMENTS

| | | | |
|---|---|---|---|
| 7,779,119 B2 | 8/2010 | Ginter et al. | |
| 8,719,814 B2 | 5/2014 | Wookey | |
| 9,558,339 B2 | 1/2017 | Turgeman | |
| 2009/0097397 A1* | 4/2009 | Moreira Sa de Souza | H04L 41/0663 370/216 |
| 2013/0227352 A1 | 8/2013 | Kumarasamy et al. | |
| 2018/0302421 A1 | 10/2018 | Schulman et al. | |
| 2019/0303232 A1* | 10/2019 | Antonio | G06F 11/302 |

OTHER PUBLICATIONS

Windows Update Troubleshooting Process, Sep. 7, 2018, https://support.automox.com/help/windows-update-troubleshooting-process, 5 pages. (Year: 2018).*

(Continued)

*Primary Examiner* — Katherine Lin
(74) *Attorney, Agent, or Firm* — Buckley, Maschoff & Talwalkar LLC

(57) ABSTRACT

In an intelligent integration error handling in enterprise systems, an integration error is logged by a sender system or a receiver system in an error monitoring application. The integration error occurred in a transaction between the integrated sender system and the receiver system. Parsing the log in real-time by a worker cloak agent, a mode of integration error correction is determined based on inputs from an intelligent correction rule service. Upon determining that the mode of integration error correction is autonomous, the integration error is automatically fixed in real-time without manual intervention by the worker cloak agent. Upon determining that the mode of integration error correction is semi-autonomous, inputs from a business user is received along with a consent to fix the integration error in real-time. Correction rules are dynamically updated in a dynamic decision table. While performing correction the sender system and receiver systems are notified.

14 Claims, 15 Drawing Sheets

(56) References Cited

OTHER PUBLICATIONS

7 Tricks to Fix Windows Update Error 0x8024402f in Windows 10/8/7, May 12, 2020, https://www.pcerror-fix.com/fix-windows-update-error-code-0x8024402f-windows-1087, 16 pages. (Year: 2020).*

Schiebel, Chatbots und RPA mit SAP, Sep. 18, 2019, https://www.it-logix.ch/, 52 pages (Year: 2019).*

Allwis et al, "Machine Learning Techniques for Predictive Maintenance," May 21, 2017, 13 pages, Retrieved from: https://www.infoq.com/articles/machine-learning-techniques-pedictive-maintenance/.

Angelopoulos et al., "Tackling Faults in the Industry 4.0 Era—A Survey of Machine-Learning Solutions and Key Aspects," Sensors 2020, 20(1), 109. Retrieved from: https://www.mdpi.com/1424-8220/20/1/109/htm.

Kaur Gill, "Automatic Log Analysis using Deep Learning and AI," XenonStack Blogs on Data Science, Aug. 27, 2020, 16 pages total. Retrieved from: https://www.xenonstack.com/blog/log-analytics-deep-machine-learning/.

LogMX the universal log analyzer webpage, 3 pages total. Retrieved from: http://logmx.com/?gclid=EAlalQobChMI66udksrg6gIVygorCh1ukwbhEAMYAyAAEgJnvD_BwE.

* cited by examiner

| DECISION TABLE | | | | | | | |
|---|---|---|---|---|---|---|---|
| IF | | | THEN | | | | |
| CLOAK BOT DECISION INPUT. ERROR MESSAGE | CLOAK BOT DECISION INPUT. ERROR MESSAGE | CLOAK BOT DECISION INPUT MESSAGE | ACTION CODE | CORRECTION SYSTEM TYPE | CORRECTION FIELD 1 | CORRECTION MECHANISM |
| '160(ARBERP_MAP)' 228 | 'Receiving' 230 | 'E' 232 | 'A' 234 | 'Receiving' 236 | 'Company Code' 238 | 'UI Element' 242 |
| '206(ARBERP_MAP)' | 'Receiving' | 'E' | 'S' | 'Receiving' | 'PO Number' | 'API' |
| '303(ARBERP_MAP)' | 'Sending' | 'W' | 'A' | 'Sending' | 'Order date' | 'UI Element' |

| Purchase Order 430966667 | Supplier 769 Hammer & Nagel | Doc.Date 01.04.2020 |

| Create Order Confirmation ∨ | Create Ship Notice | Create Invoice ∨ | Create Quality Notification |

| Order Details | Order History |

From
Organization X
Dietmar-Hopp-Allee
69190 Waldorf

Germany

To
Organization Y
Inlandslieferant DE-Test
28199 Bremen

Germany
Phone:
Fax:

Purchase Order
(New)
430966667
Amount: 3000.00 EUR
Version:1

Payment Terms
3.000% 14
2.000% 20

Contact Information
Supplier Address
Hammer &Nagel
Wimmergasse ok second
92784 Winsetn Germany
Address Id: 00000000769

| Standard PO | 430966667 | Supplier | 769 Hammer & Nagel | Doc. Date | 01.04.2020 |

Walldorf
Germany

Tax

○ Header level tax   ○ Line level tax

Category: VAT
Location:
Description: 769 Hammer & Nagel
Date of Pre-Payment:

Taxable Amount
Tax Rate type: VAT
Rate %: 2    — 504
Tax Amount

Shipping

○ Header level tax   ○ Line level shipping

Ship From: DE-Test      Ship To: Plant 0001
Bremen                  Deliver To: Germany
Germany Payment Term

| Log | Edit | Goto | System | Help |

*Display logs*

Technical Information

| Date/Time/User | | | | | |
|---|---|---|---|---|---|
| 01.04.2020 07:36:48 | 4 FA163E95BDE01E... | CXML_INTEGRAT... | INBOUND | CL_ARBFND...Dialog proces... | 000047389 |
| 01.04.2020 07:39:48 | 4 FA163E95BDE01E... | CXML_INTEGRAT... | INBOUND | CL_ARBFND...Dialog proces... | 000070544 |
| 01.04.2020 07:40:08 | 4 FA163E95BDE01E... | CXML_INTEGRAT... | INBOUND | CL_ARBFND...Dialog proces... | 000073689 |
| 01.04.2020 07:42:40 | 6 FA163E95BDE01E... | CXML_INTEGRAT... | INBOUND | CL_ARBFND...Dialog proces... | 000073676 |
| 01.04.2020 08:30:48 | 4 FA163EJJBDE01E... | CXML_INTEGRAT... | INBOUND | CL_ARBFND...Dialog proces... | 000073674 |
| 01.04.2020 08:21:54 | 4 FA163EJJBDE01E... | CXML_INTEGRAT... | INBOUND | CL_ARBFND...Dialog proces... | 000047366 |
| 01.04.2020 09:45:14 | 4 FA163EFFBDE01E... | CXML_INTEGRAT... | INBOUND | CL_ARBFND...Dialog proces... | 000047804 |
| 01.04.2020 09:48:48 | 6 FA163EFFBDE01E... | CXML_INTEGRAT... | INBOUND | CL_ARBFND...Dialog proces... | 000047379 |
| 01.04.2020 10:36:13 | 4 FA163EFFBDE01E... | CXML_INTEGRAT... | INBOUND | CL_ARBFND...Dialog proces... | 000047395 |

| Type | Message Text |
|---|---|
| ■ | Starting to process cXML message InvoiceDetailRequest |
| ■ | cXML message Payload ID: 1585755139745-12820456881@10.162.97.164 |
| ■ | External document ID: Inv 4500046213 |
| ■ | Incoming Invoice: 5105604249 2920 |

INTELLIGENT INTEGRATION ERROR HANDLING IN ENTERPRISE SYSTEMS

BACKGROUND

Enterprise system integration is a process of connecting various systems and applications to share and communicate information. Integration of applications enables flow of data, exchange of documents, transfer of files, etc., from one enterprise application to another. Typically, in a scenario when error occurs while processing a request at an enterprise application, technical support is contacted to identify and troubleshoot the error. The technical support team might check error monitoring applications, configurations, settings, logs, etc., to identify the cause of the error. In such cases, identifying the cause of the error and fixing it is a time consuming and predominantly a manual process. This method of error handling is reactive and time consuming. There is a need to improve the efficiency of handling errors related to integration of enterprise systems and ensure business continuity.

BRIEF DESCRIPTION OF THE DRAWINGS

The claims set forth the embodiments with particularity. The embodiments are illustrated by way of examples and not by way of imitation in the figures of the accompanying drawings in which like references indicate similar elements. Various embodiments, together with their advantages, may be best understood from the following detailed description taken in conjunction with the accompanying drawings.

FIG. 2B is a decision table illustrating mapping of error scenarios and corresponding corrective actions, according to one embodiment.

FIG. 5A to FIG. 5F in combination illustrates screenshots of applications corresponding to the use case explained in FIG. 4, according to one embodiment.

DETAILED DESCRIPTION

Embodiments of techniques for intelligent integration error handling in enterprise systems are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments. Various embodiments below describe a method of automatically and proactively monitoring and mitigating errors related to Integration of Enterprise systems.

Figure 1:
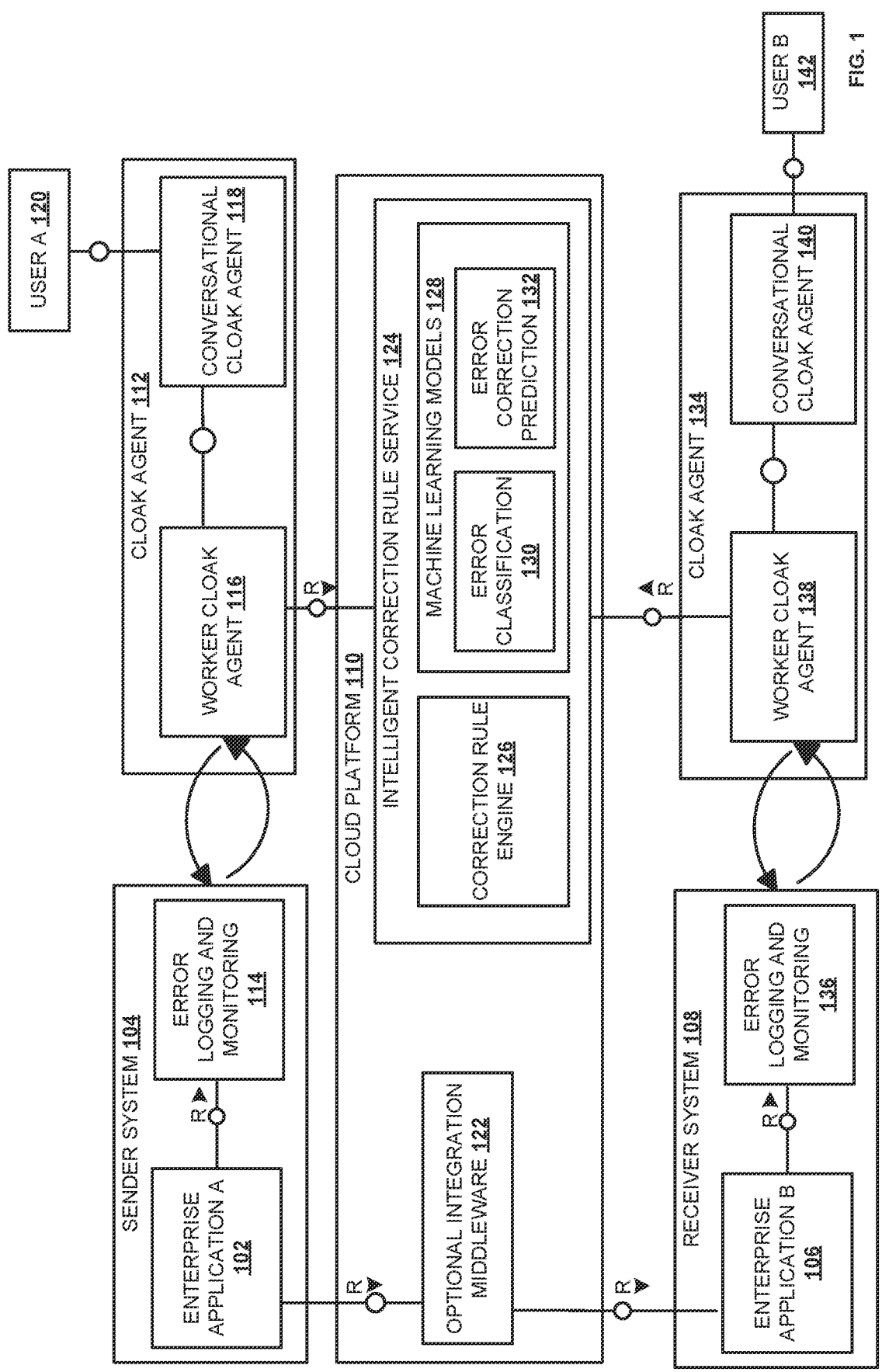
FIG. 1 is a block diagram illustrating high level architecture for Intelligent integration error handling in enterprise systems, according to one embodiment.

FIG. 1 is a block diagram illustrating high level architecture for Intelligent integration error handling in enterprise systems, according to one embodiment. Consider a typical integration environment, where 'enterprise application A' 102 executing in sender system 104 communicates with 'enterprise application B' 106 executing in receiver system 108. The sender system 104 is an enterprise system. The receiver system 108 may be a customer system or business partner system integrated with the sender system 104 over a cloud platform or cloud network 110. The integration over cloud platform or cloud network can be facilitated by integration add-ons like SAP Business Suite Add-On for Ariba Network integration, SAP Ariba Cloud Integration Gateway, SAP Ariba Cloud Integration adapter, SAP Cloud Platform Integration Suite, etc. Cloak agent 112 is an application that proactively and constantly monitors erroneous transactions in error logging and monitoring application 114 or function at the sender system 104. The cloak agent 112 includes worker cloak agent 116 and conversational cloak agent 118. The worker cloak agent 116 constantly monitors the error logs or error monitoring applications at the sender system 104. The worker cloak agent 116 is implemented as a robotic process automation bot that runs in an unattended mode. The worker cloak agent 116 has the capability to monitor several applications such as log or error monitoring applications simultaneously and continuously. The worker cloak agent 116 monitors and mitigates error arising at the sender system 104 in real-time without any delay.

Conversational cloak agent 118 is a chatbot application or a digital assistant that leverages conversational Artificial Intelligence (AI). The administrator or user A 120 interacts with the conversational cloak agent 118 on a need basis for processing erroneous transactions. Optional integration middleware 122 enables processing and conversion of data shared between the sender system 104 and the receiver system 108. Intelligent correction rule service 124 enables the worker cloak agent 116 to determine the course of correction for erroneous transactions. The Intelligent correction rule service 124 takes input values like error message number, system type, error, etc., while determining the intelligent correction rule to be applied. The intelligent correction rule service 124 includes the correction rule engine 126 to help determine the matching or best fit intelligent correction rule to be applied for the erroneous transaction. At the core of the Intelligent correction rule service 124 is the correction rule engine 126 using which customers and application developers can configure rules for error corrections. The correction rule engine 126 may also be referred to as a business rule engine and may be implemented using a standard business rule framework like enterprise business rules framework application, business rules in cloud platform application, or any custom implementation.

In case when the intelligent correction rule service 124 fails to return a matching intelligent correction rule, the intelligent correction rule service 124 would use the machine learning models 128 to predict the required corrections. The machine learning models 128 may include various modules such as error classification 130, error correction prediction 132, etc. Any machine learning model may be used to enhance the matching and identifying similar intelligent correction rules. The new correction rule structure can be similar, but the content will be specific to the new correction rule. The matching intelligent correction rule is provided as input to the worker cloak agent 116. Based on the inputs in the matching intelligent correction rule, the worker cloak agent 116 determines how the correction is to be performed to fix or rectify the erroneous transaction. In the case the intelligent correction rule includes the correction type as 'autonomous', the worker cloak agent 116 fixes or rectifies the erroneous transaction in the autonomous mode without human intervention. In the case the intelligent correction rule includes the correction type as 'semi-autonomous', the worker cloak agent 116 fixes or rectifies the erroneous transaction in the semi-autonomous mode with human intervention. In the semi-autonomous mode, input may be provided by user A 120 to fix or rectify the erroneous transaction. The conversational cloak agent 118 sends a message to the user A 120 with required information for the user A 120 to make an informed decision. The conversational cloak agent 118 acts like a digital assistant enabling communication set up between the worker cloak agent 116 and the user A 120.

Similarly, at the receiver system 108, cloak agent 134 is an application that proactively and constantly monitors erroneous transactions in error logging and monitoring application 136 or function at the receiver system 108. The cloak agent 134 includes worker cloak agent 138 and conversational cloak agent 140. The worker cloak agent 138 constantly monitors the error logs or error monitoring applications at the receiver system 108. Intelligent correction rule service 124 enables the worker cloak agent 138 to determine the course of correction for erroneous transactions. Since the matched intelligent correction rule includes a correction system as the preferred system to execute the correction, the worker cloak agent of that correction system performs the correction. If the preferred correction system is set as the sender system 104, error correction is performed by the sender system 104. Similarly, if the preferred correction system is set as the receiver system 108, error correction is performed by the receiver system 108. The intelligent correction rule service 124 includes the correction rule engine 126 to help determine the matching or best fit intelligent correction rule to be applied for the erroneous transaction. In the case the intelligent correction rule includes the correction type as 'autonomous', the worker cloak agent 138 fixes or rectifies the erroneous transaction in the autonomous mode without human intervention. In the case the intelligent correction rule includes the correction type as 'semi-autonomous', the worker cloak agent 138 fixes or rectifies the erroneous transaction in the semi-autonomous mode with human intervention. In the semi-autonomous mode, input may be provided by user B 142 to fix or rectify the erroneous transaction.

Figure 2A:
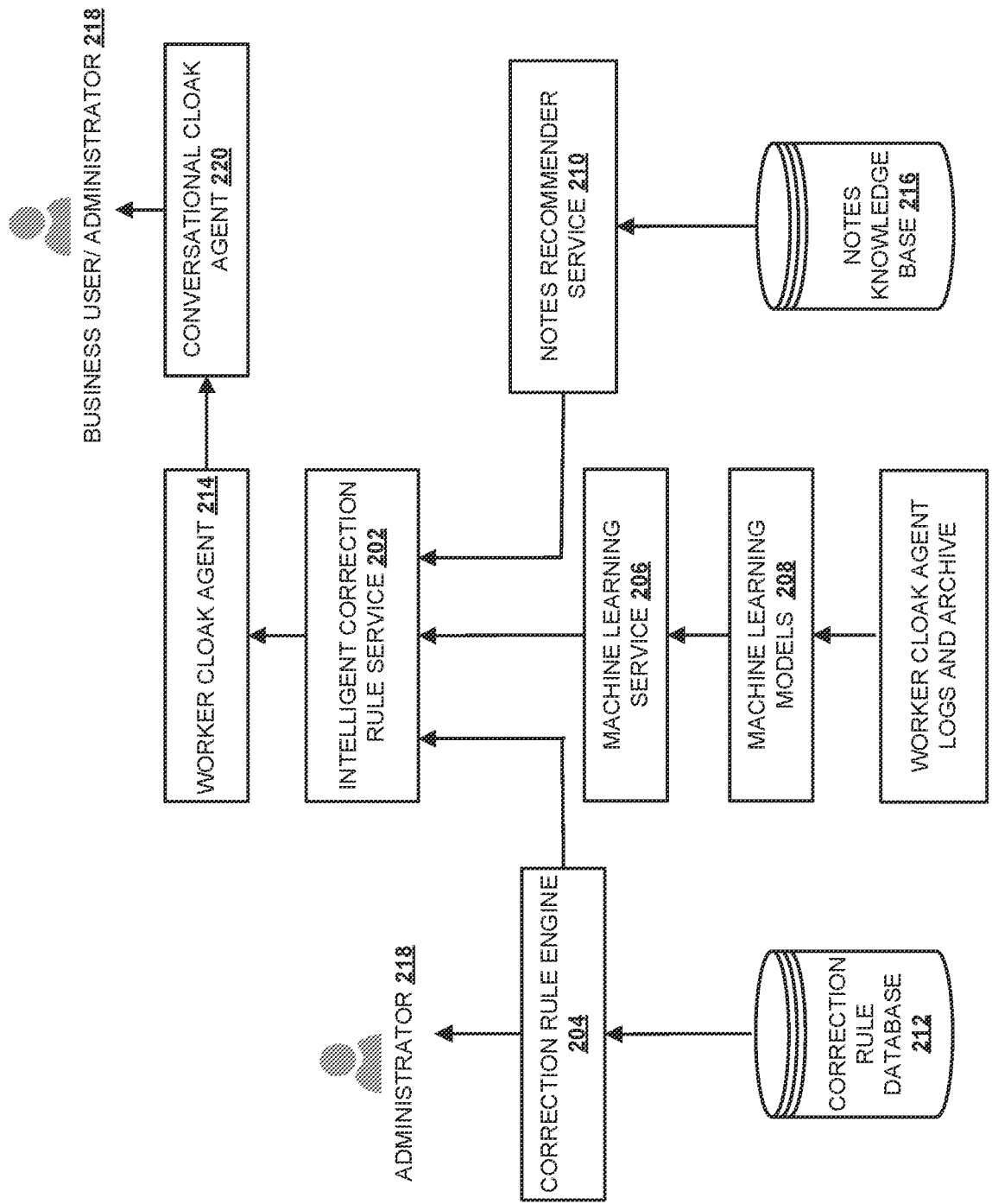
FIG. 2A is a block diagram illustrating intelligent correction rule service in intelligent integration error handling in enterprise systems, according to one embodiment.

FIG. 2A is a block diagram illustrating intelligent correction rule service in intelligent integration error handling in enterprise systems, according to one embodiment. The intelligent correction rule service 202 includes and works in cohesion with correction rule engine 204, machine learning service 206 that includes machine learning models 208 and notes recommender service 210. The correction rule engine 204 maintains a mapping of error scenarios and corresponding corrective actions in the form of a decision table in correction rule database 212. The mapping in the decision table is pre-defined by business users and technical integration experts. Typically, the decision table is pre-defined with the mapping information and over a period, the decision table is dynamically populated with new mapping information of error scenarios and corresponding corrective actions. When an erroneous transaction is identified by worker cloak agent 214, the worker cloak agent 214 invokes the intelligent correction rule service 202, to determine a closest matching intelligent correction rule to be applied to rectify or fix the erroneous transaction. The intelligent correction rule service 202 invokes the correction rule engine 204 to determine the closest matching intelligent correction rule. If the correction rule engine 204 finds a matching intelligent correction rule in the decision table, the matched intelligent correction rule is returned to the worker cloak agent 214 by the intelligent correction rule service 202. In a scenario where the correction rule engine 204 does not find a matching intelligent correction rule, the intelligent correction rule service 202 invokes the machine learning service 206 to predict a matching intelligent correction rule. The machine learning service 206 uses the machine learning models 208. The machine learning models 208 use machine learning algorithms such as 'multiclass classifier/classification' to predict the closest or similar intelligent correction rule based on a confidence factor. The multiclass classifier is trained based on historic data that contains information related to the error such as error message ID, error message, correction field, etc., along with the intelligent correction rule that was applied for that error message. The machine learning service 206 predicts the closest matching intelligent correction rule that can be applied for the erroneous transaction for which the matching intelligent correction rule was not available or found in the decision table. Such predicted correction is applied in semi-autonomous mode, where consent from administrator 218 or business user is required.

The implementation of the intelligent correction rule service 202 can also be backed by machine learning models for classifying and predicting the error corrections. For example, multiclass classifier can be used to predict the closest correction rule in the correction rule engine 204. The multi-class classifier is trained based on the historic data that contains the information related to the error, such as error message number, type, correction fields etc., and the correction rule that was applied for that error correction. Thus, the classifier predicts a closest matching business rule/correction rule that could be applied for an error that has newly occurred. Such predicted error corrections are performed in corresponding systems only after receiving inputs/consent from business user/administrator 218 via the conversational cloak agent 220. If business user/administrator 218 provides consent for the predicted correction, the worker cloak agent 214 makes the desired corrections and dynamically adds this as a rule to the correction rule engine 204 after receiving a confirmation from the business user/administrator 218. The business user/administrator 218 may confirm the new correction rule by navigating to the app URL in a user interface (not shown), where a draft rule may be displayed to the business user/administrator 218 via conversational cloak agent 220). Upon confirmation, the correction rule gets persisted in the correction rule database 212. Additionally, the machine learning models 208 can be trained with data from data sources such as customer messages, etc., to look for solutions described in those messages, where the worker cloak agent 214 may infer some of the simple corrections, or otherwise provide the solution as a recommendation. Such solutions or correction rules are added to this predicted correction rule engine 204 upon receiving a confirmation from the business user/administrator 218.

Additionally, the intelligent correction rule service 202 invokes the notes recommender service 210 to identify notes corresponding to the error if any and returns it to the worker cloak agent 214. The notes recommender service 210 uses fuzzy search to identify notes from the notes knowledgebase 216. The notes recommender service 210 may also reuse existing Application Programming Interface (APIs) that can return relevant notes corresponding to the error. The worker cloak agent 214 while communicating with the administrator or business user in semi-autonomous mode, sends the identified notes along with the predicted intelligent correction rule. Based on the information returned by the intelligent correction rule service 202 to the worker cloak agent 214, the worker cloak agent 214 initiates action in autonomous or semi-autonomous mode. If the intelligent correction rule found in the decision table is retuned by the intelligent correction rule service 202 along with the correction type as autonomous, the worker cloak agent 214 will fix or rectify the erroneous transaction without any human intervention. If no intelligent correction rule is found in the decision table and the predicted intelligent correction rule is returned by the intelligent correction rule service 202 along with the correction type as autonomous, the worker cloak agent 214 will fix or rectify the erroneous transaction in autonomous mode. The predicted intelligent correction rule is sent to the administrator 218 for approval. Once the administrator 218 approves the predicted intelligent correction rule, it is added as a new entry in the decision table along with the error related information and mode of integration error correction as autonomous. In a scenario where the predicted intelligent correction rule is not approved by the administrator 218, the intelligent correction rule service 202 invokes the notes recommender service 210 to identify notes corresponding to the error if any from the notes knowledgebase 216 and returns it to the worker cloak agent 214. The worker cloak agent 214 displays the notes to the administrator 218 via the conversational cloak agent 220. The administrator 218 may use this knowledge to create or generate intelligent correction rule.

FIG. 2B is a decision table illustrating mapping of error scenarios and corresponding corrective actions, according to one embodiment. The decision table 224 includes integration error related information. The intelligent correction rule takes into account the error message number, message type (E=Error, I=Information, W=Warning), type of the system where this error occurred (Sender or Receiver), based on which it identifies the correction system (Correction System Type: Sender or Receiver), the mode of integration error correction (Action Code: A=Autonomous, S=Semi-Autonomous), fields to be considered for correction, etc. Consider row 226, here the error message is '160 (ARBERP_MAP)' 228, error system type is 'receiving' 230, error message type is 'E' 232 where 'E' indicates error, mode of integration error correction is 'A' 234 where 'A' indicates autonomous correction mode, correction system type is 'receiving' 236, correction field is 'company code' 238, correction mechanism is 'UI Element' 242, etc. The decision table 224 may include additional fields depending on the requirement of the enterprise. The correction system type indicates the pre-configured system that is best suited or optimum to correct that specific integration error. Initially, the mapping information in the decision table 224 is pre-configured or pre-defined. Eventually, new entries are dynamically added to the decision table 224 as new transaction errors arise and intelligent correction rules are predicted. For example, when an integration error is logged in an application log file, the worker cloak agent identifies the integration error and invokes the intelligent correction rule service. The intelligent correction rule service invokes correction rule engine to parse the decision table 224 to find a matching error. It is determined whether the integration error received from the worker cloak agent matches one of the error messages in the decision table 224. Upon determining a match, the corresponding matched intelligent correction rule is returned to the worker cloak agent by the intelligent correction rule service. If the integration error message received from the worker cloak agent '206 (ARBERP_MAP)' matches with the error message in row number 240 of the decision table 224, then, the corresponding mode of integration error correction 'S', correction system 'receiving' and correction field 'PO number' is returned to the worker cloak agent by the intelligent correction rule service. If the unique combination of error message ID, error message, etc., in 240, matches with the integration error, corresponding correction information i.e. intelligent correction rule is returned to the worker cloak agent.

Figure 3A:
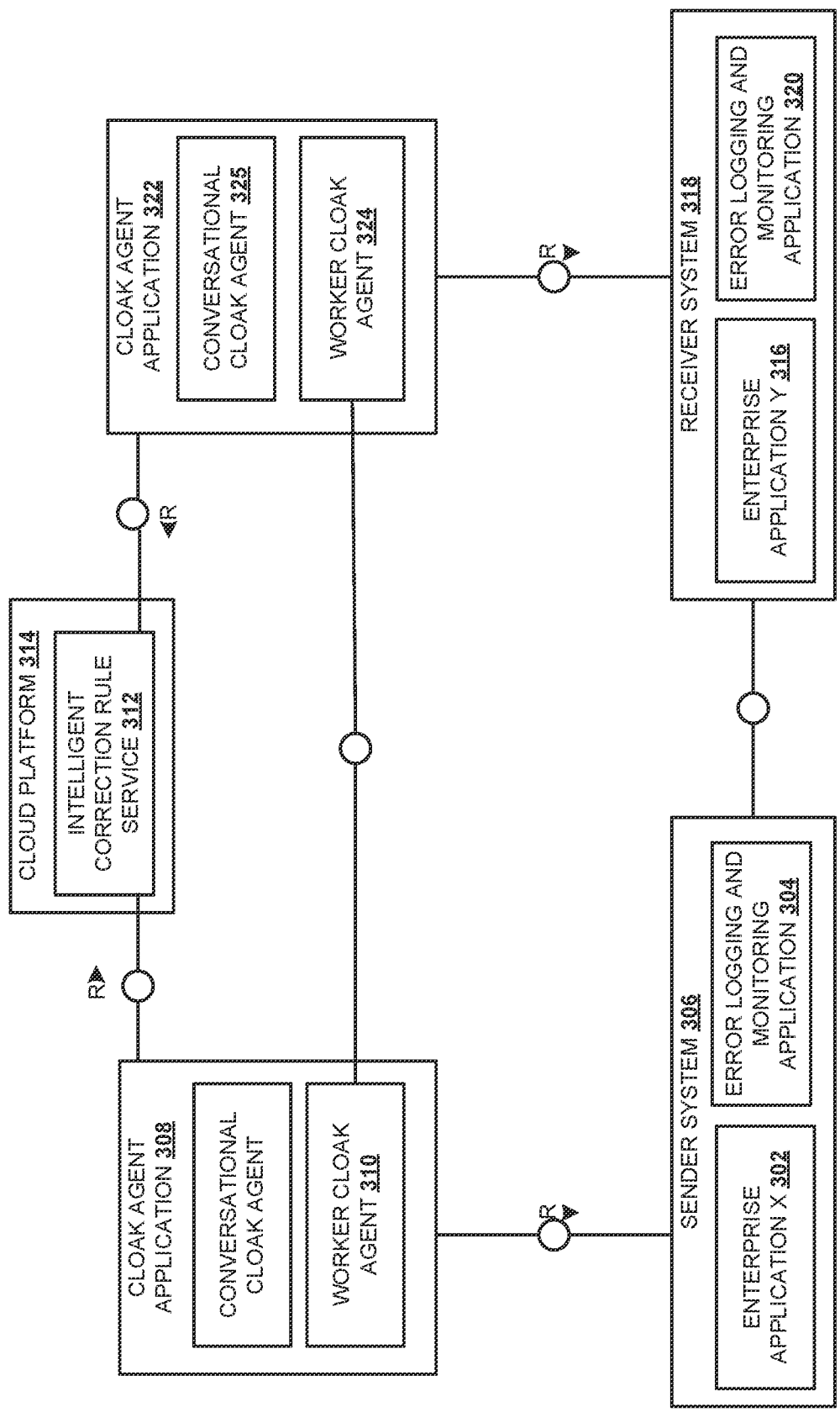
FIG. 3A is a block diagram illustrating autonomous mode of execution of worker cloak agent, according to one embodiment.

FIG. 3A is a block diagram illustrating autonomous mode of execution of a worker cloak agent, according to one embodiment. 'Enterprise application X' 302 and error logging and monitoring application 304 is executing in sender system 306. Cloak agent application 308 executing the worker cloak agent 310 is deployed to work in cohesion with the sender system 306. The worker cloak agent 310 parses through the transactions or logs in the error logging and monitoring application 304 to check for any errors or failures, in real-time. The worker cloak agent 310 may also be configured to parse the transactions in the error logging and monitoring application 304 at periodic intervals or specific intervals or custom defined intervals which are set for its execution. When the worker cloak agent 310 identifies an erroneous transaction, the worker cloak agent 310 uses the intelligent correction rule service 312 in the cloud platform 314 to decide the mode and method of error correction.

The 'enterprise application X' 302 executing in the sender system 306 is integrated with the 'enterprise application Y' 316 executing in the receiver system 318. In such an integration scenario the sender system 306 may post a document and the receiver system 318 may receive the document. The integration between the systems is over the cloud platform 314. For example, when a 'document AB' is sent from the sender system 306 and received at the receiver system 318, the receiver system 318 identifies an error in the 'document AB'. The identified error is logged by the receiver system 318 in the error logging and monitoring application 320. Cloak agent application 322 executing the worker cloak agent 324 is deployed to work in cohesion with the receiver system 318. The worker cloak agent 324 parses the error logging and monitoring application 320 in real-time to identify if any erroneous transactions are logged. The worker cloak agent 324 parses the error logging and monitoring application 320 in real-time and identifies that the error has occurred in 'document AB' at the receiver system 318.

The enterprise may pre-configure the most optimum system eligible to fix the erroneous transaction at a functional level. For example, the enterprise may pre-configure that for the Purchase order response, the most optimum system to handle the erroneous transaction is the receiver system. Whereas, the enterprise may pre-configure that for the Invoice function, the most optimum system to handle the erroneous transaction is the sender system. Depending on the requirements of the enterprise, such functional level configurations or pre-configurations are made. When the worker cloak agent 324 parses the error logging and monitoring application 320 in real-time and identifies the erroneous transaction logged due to error that occurred in the 'document AB' at the receiver system 318. The worker cloak agent 324 uses the intelligent correction rule service 312 to decide on how the correction is to be made. The intelligent correction rule service 312 would inform the worker cloak agent 324 on the changes to be made in the receiver system 318.

The intelligent correction rule service 312 accesses a decision table including correction rules. The intelligent correction rule service 312 invokes a correction rule engine to parse the decision table to find a matching error. It is determined whether the error received from the worker cloak agent 324 matches the error messages in the decision table. Upon determining a match, the corresponding matched correction rule is returned to the worker cloak agent 324 by the intelligent correction rule service 312. If a mode of integration error correction "A-autonomous mode" is returned by the intelligent correction rule service 312, then the worker cloak agent 324 autonomously completes the desired corrections and retriggers or restarts the 'document AB' sending which eventually results in the successful processing of the document. This is referred to as autonomous mode of execution of the worker cloak agent 324. Since the matched intelligent correction rule includes the correction system as the preferred system to execute the correction, the worker cloak agent of that correction system performs the autonomous correction. If the preferred correction system is set as the sender system 306, error correction is performed by the sender system 306. Similarly, if the preferred correction system is set as the receiver system 318, error correction is performed by the receiver system 318.

If a mode of integration error correction "S-semi-autonomous mode" is returned by the intelligent correction rule service 312, then the worker cloak agent 324 will fix or rectify the erroneous transaction in semi-autonomous mode with human intervention. Once response is received from a business user, semi-autonomous correction of error is performed. Retriggering or restarting the document sending which eventually results in the successful processing of the document is completed. This is referred to as semi-autonomous mode of execution of the worker cloak agent 324.

Figure 3B:
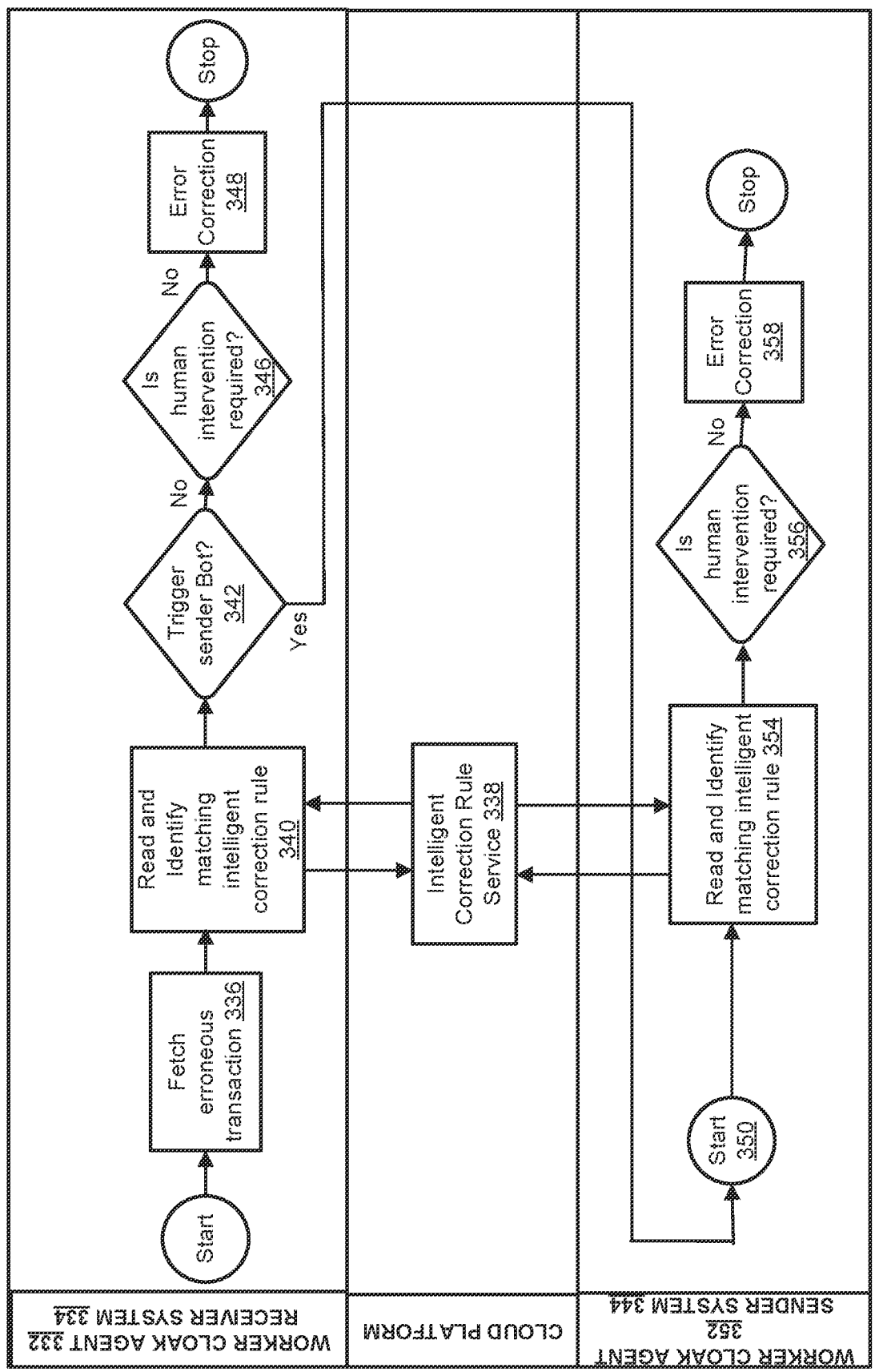
FIG. 3B is a flow diagram illustrating autonomous mode of execution of worker cloak agent, according to one embodiment.

FIG. 3B is a flow diagram illustrating autonomous mode of execution of a worker cloak agent, according to one embodiment. The worker cloak agent 332 at the receiver system 334, parses transactions in a log file of the error logging and monitoring application deployed at the receiver system 334. The worker cloak agent 332 fetches an integration error or erroneous transaction 336 from the log file. The worker cloak agent 332 accesses intelligent correction rule service 338 to identify a matching intelligent correction rule 340 from a decision table. The intelligent correction rule service 338 contains all the information required to resolve the error in the decision table. For example, intelligent correction rules in the decision table includes error message, error system type, error message type, correction mode, correction system type, correction field, correction mechanism, etc. The matched intelligent correction rule is returned to the worker cloak agent 332 by the intelligent correction rule service 338. At step 342, the worker cloak agent 332 determines whether the correction is to be performed at sender system 344. Upon determining that the correction is to be performed at the receiver system 334 and not the sender system 344, the worker cloak agent 332 determines whether human intervention is required at step 346. If the intelligent correction rule returned to the worker cloak agent 332 includes the mode of integration error correction as 'A-autonomous', the worker cloak agent 332 determines that no human intervention is required, and the correction can be performed in an autonomous mode. Accordingly, error correction 348 is performed by the worker cloak agent 332 at the receiver system 334.

At step 342, upon determining that the correction is to be performed at the sender system 344 and not the receiver system 334, the worker cloak agent 332 sends a trigger to the sender system 344 to start 350 the correction activity. The worker cloak agent 352 accesses the intelligent correction rule service 338 to identify a matching intelligent correction rule 354 from the decision table. If the intelligent correction rule returned to the worker cloak agent 352 includes the mode of integration error correction as 'A-autonomous', the worker cloak agent 352 determines that no human intervention is required 356, and the correction can be performed in an autonomous mode. Accordingly, error correction 358 is performed by the worker cloak agent 352 at the sender system 344.

With reference to FIG. 3A, if the mode of integration error correction "S-semi-autonomous mode" is returned by the intelligent correction rule service 312, then the worker cloak agent 310 or the worker cloak agent 324 will fix or rectify the erroneous transaction in the semi-autonomous mode with human intervention. Depending on the preferred correction system pre-configured, the corresponding worker cloak agent will perform the error correction. When the intelligent correction rule returns the mode of integration error correction as "S-semi-autonomous mode", the correction cannot be performed by just the worker cloak agent. Such errors might require further inputs from the business user or administrator on how the correction is to be performed by the user or the worker cloak agent 324 or at least provide a consent for the worker cloak agent before it executes the correction in the desired system. In such a situation, interaction of the corresponding worker cloak agent 324 with business user or the administrator is achieved with the help of a conversational cloak agent 325 based on conversational Artificial Intelligence technology. The worker cloak agent 324 reports the erroneous transaction e.g. integration error to the business user or the administrator via the conversational cloak agent 325 and may ask for further inputs, required for processing the integration error, including the consent to make the correction. Once the required input is received from the business user or the administrator, the worker cloak agent 324 resumes to make the required corrections. The erroneous transaction is then retriggered/restarted again in the desired system, after which the document is processed successfully.

Figure 3C:
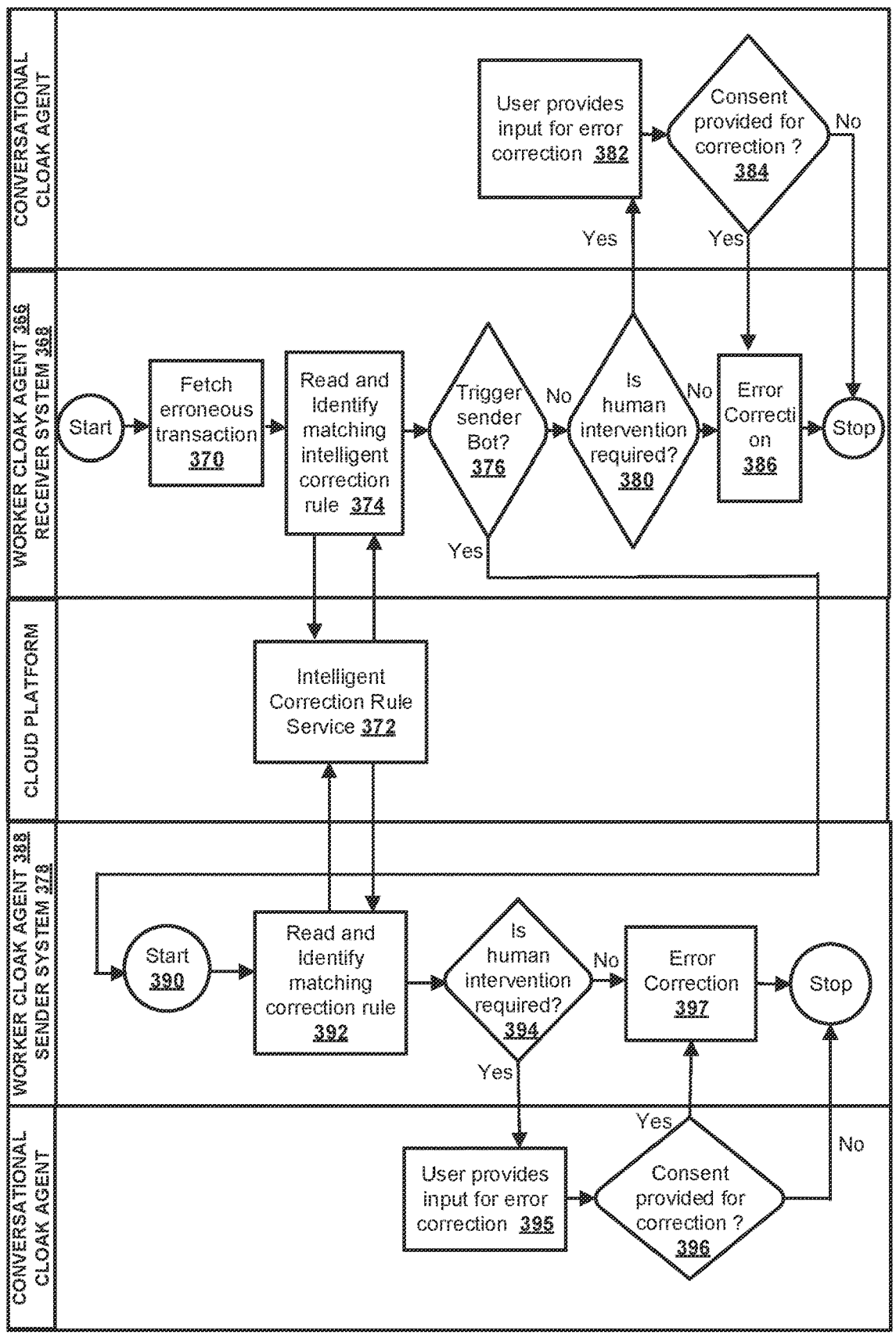
FIG. 3C is a flow diagram illustrating semi-autonomous mode of execution of worker cloak agent, according to one embodiment.

FIG. 3C is a flow diagram illustrating semi-autonomous mode of execution of worker cloak agent, according to one embodiment. The worker cloak agent 366 at the receiver system 368, parses transactions in a log file of the error logging and monitoring application deployed at the receiver system 368. The worker cloak agent 366 fetches an integration error or erroneous transaction 370 from the log file. The worker cloak agent 366 accesses intelligent correction rule service 372 to identify a matching intelligent correction rule 374 from a decision table. The intelligent correction rule service 372 contains all the information required to resolve the error in the decision table. For example, intelligent correction rules in the decision table includes error message, error system type, error message type, correction mode, correction system type, correction field, correction mechanism, etc. The matched intelligent correction rule is returned to the worker cloak agent 366 by the intelligent correction rule service 372. At step 376, the worker cloak agent 366 determines whether the correction is to be performed at sender system 378. Upon determining that the correction is to be performed at the receiver system 368 and not the sender system 378, the worker cloak agent 366 determines whether human intervention is required at step 380.

If the intelligent correction rule returned to the worker cloak agent 366 includes the mode of integration error correction as 'S-semi-autonomous', the worker cloak agent 366 determines that human intervention is required, and the correction can be performed in the semi-autonomous mode. Upon determining that human intervention is required, the worker cloak agent 366 reports the erroneous transaction e.g. integration error to a business user or an administrator via the conversational cloak agent and may ask for further inputs required for processing the integration error. The business user provides input for the error correction 382 and provides consent for the error correction 384. Once consent is provided by the business user, the worker cloak agent 366 resumes to make the required corrections 386. In a scenario where the business user does not provide consent for the correction at step 384, the worker cloak agent 366 holds or halts the erroneous transaction 370 and moves on with parsing the transaction log for other integration errors. Until the consent is received from the business user, the worker cloak agent 366 may not proceed with fixing the erroneous transaction. The worker cloak agent 366 may wait for a reasonable period that is pre-configured and send an email to the business user that the worker cloak agent 366 is awaiting consent from the business user. Until consent is received from the business user, worker cloak agent 366 may not correct the error.

At step 376, if it is determined that the correction is to be performed at the sender system 378 and not the receiver system 368, the worker cloak agent 366 sends a trigger to the sender system 378 to start 390 the correction activity. The worker cloak agent 388 accesses the intelligent correction rule service 372 to identify a matching correction rule 392 from the decision table. If the intelligent correction rule returned to the worker cloak agent 388 includes the mode of integration error correction as 'S-semi-autonomous', the worker cloak agent 388 determines that human intervention is required 394, and the correction can be performed in the semi-autonomous mode.

Upon determining that human intervention is required, the worker cloak agent 388 reports the erroneous transaction e.g. integration error to a business user or an administrator via the conversational cloak agent and may ask for further inputs required for processing the integration error. The business user provides input for the error correction 395 and provides consent for the error correction 396. Once consent is provided by the business user, the worker cloak agent 388 resumes to make the required corrections 397. In a scenario where the business user does not provide consent for the correct at step 396, the worker cloak agent 388 holds or halts the erroneous transaction 370 and moves on with parsing the transaction log for other integration errors. Until the consent is received from the business user, the worker cloak agent 388 may not proceed with fixing the erroneous transaction. The worker cloak agent 388 may wait for a reasonable period that is pre-configured and send an email to the business user that the worker cloak agent 388 is awaiting consent from the business user. Until consent is received from the business user, worker cloak agent 388 may not correct the error.

Figure 4:
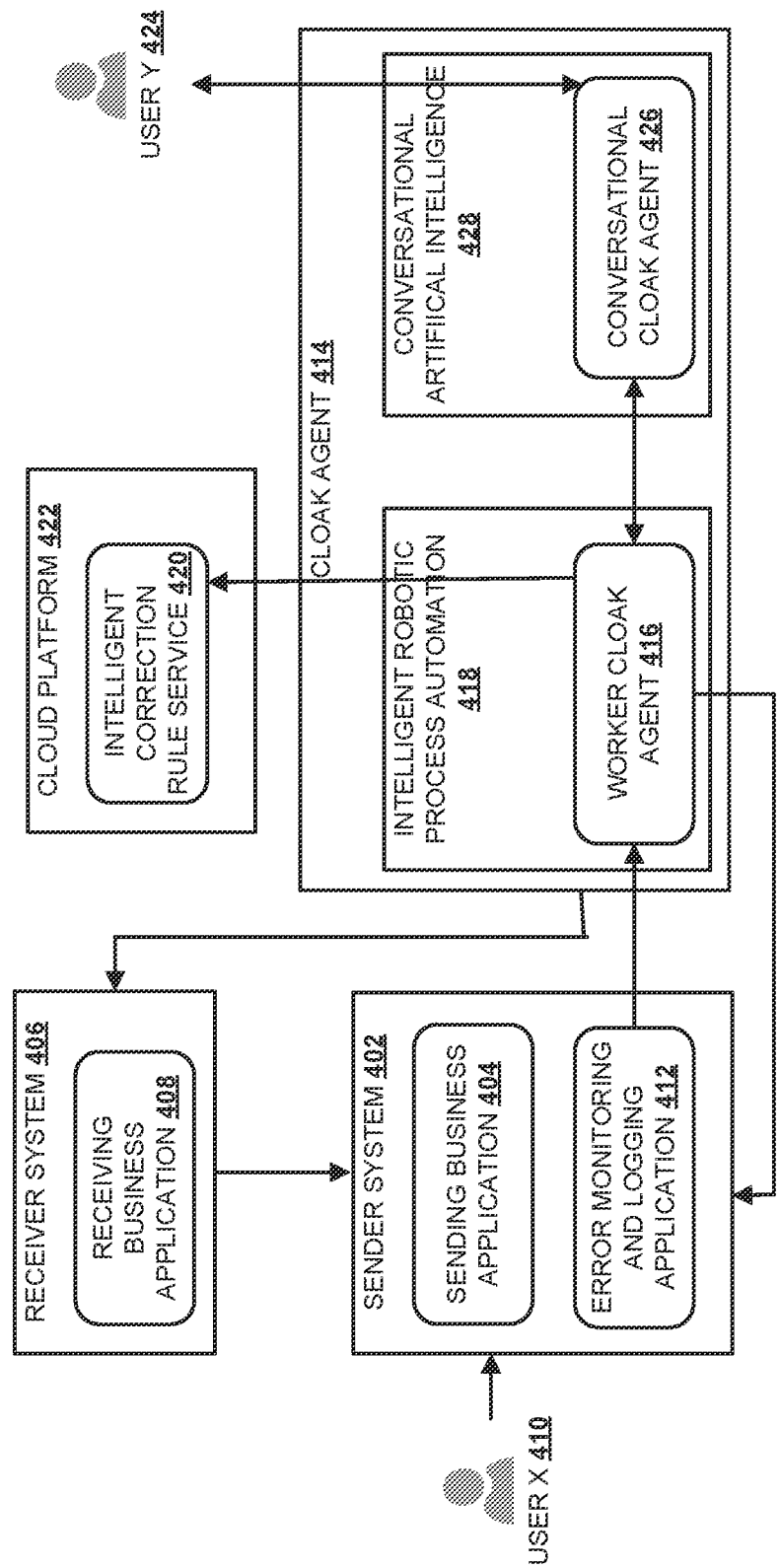
FIG. 4 is an exemplary use case illustrating intelligent integration error handling in enterprise systems, according to one embodiment.

FIG. 4 is an exemplary use case illustrating intelligent integration error handling in enterprise systems, according to one embodiment. Consider an integration scenario between sender system 402 with sending business application 404 and receiver system 406 with receiving business application 408. Where an invoice is created in the receiver system 406 based on a purchase order sent from the sender system 402. This invoice is then sent back to the sender system 402. The flow of business process is described below. 'User X' 410 sends a purchase order document from the sender system 402 to the receiver system 406. The purchase order is received at the receiver system 406. Based on this purchase order, an invoice is generated at the receiver system 406.

The generated invoice is sent from the receiver system 406 to the sender system 402. For example, a specific information such as rate of tax was incorrectly entered by the receiver system 406 before receiving by the sender system 402. At the sender system 402 the invoice failed due to the wrong rate of tax value. This erroneous transaction is logged in the error monitoring and logging application 412. Cloak agent application 414 includes worker cloak agent 416 that executes as intelligent robotic process automation 418. The worker cloak agent 416 parses the logs in the error monitoring and logging application 412 in real-time. When the worker cloak agent 416 identifies the erroneous transaction, the worker cloak agent 416 access intelligent correction rule service 420 in the cloud platform 422.

The intelligent correction rule service 420 contains all the information required to resolve the error in a decision table. For example, intelligent correction rules in the decision table includes error message, error system type, error message type, correction mode, correction system type, correction field, correction mechanism, etc. The matched intelligent correction rule is returned to the worker cloak agent 416 by the intelligent correction rule service 420. The worker cloak agent 416 determines whether the correction is to be performed at sender system 402 or the receiver system 406. Based on the matched intelligent correction rule returned to worker cloak agent 416, it is determined that the correction is to be performed at the sender system 402 and not the receiver system 406. The worker cloak agent 416 also determines whether human intervention is required or not.

If the intelligent correction rule retuned to the worker cloak agent 416 includes the mode of integration error correction as 'A-autonomous', the worker cloak agent 416 automatically corrects the error in the autonomous mode without human intervention. But, in this scenario, the intelligent correction rule returned to the worker cloak agent 416 includes the mode of integration error correction as 'S-semi-autonomous'. The worker cloak agent 416 determines that human intervention is required, and the correction can be performed in the semi-autonomous mode. Upon determining that human intervention is required, the worker cloak agent 416 reports the erroneous transaction e.g. integration error to a 'user Y' 424 via conversational cloak agent 426. The conversational cloak agent 426 is based on the conversational artificial intelligence 428 technology. The conversational cloak agent 426 may ask for further inputs from the user Y 424 required for processing the integration error. The user Y 424 provides input for the error correction and provides consent for the error correction. Once consent is provided by the user Y 424, the worker cloak agent 416 resumes to make the required corrections.

The worker cloak agent 416 notifies a worker cloak agent (not shown) at the receiver system 406 that such an error correction has taken place. Typically, all the systems involved in the process are notified, for example, sender system, receiver system, etc., at the specific milestones. The worker cloak agent 416 will reinitiate the transaction and the invoice will successfully be received at the sender system 402. In a scenario where the business user does not provide consent for the correct, the worker cloak agent 416 holds or halts the erroneous transaction and moves on with parsing the transaction log for other integration errors. Until the consent is received from the 'user Y' 424, the worker cloak agent 416 may not proceed with fixing the erroneous transaction. The worker cloak agent 416 may wait for a reasonable period that is pre-configured and send an email to the business user that the worker cloak agent 416 is awaiting consent from the business user. Until consent is received from the business user, worker cloak agent 416 may not correct the error.

Figure 5C:
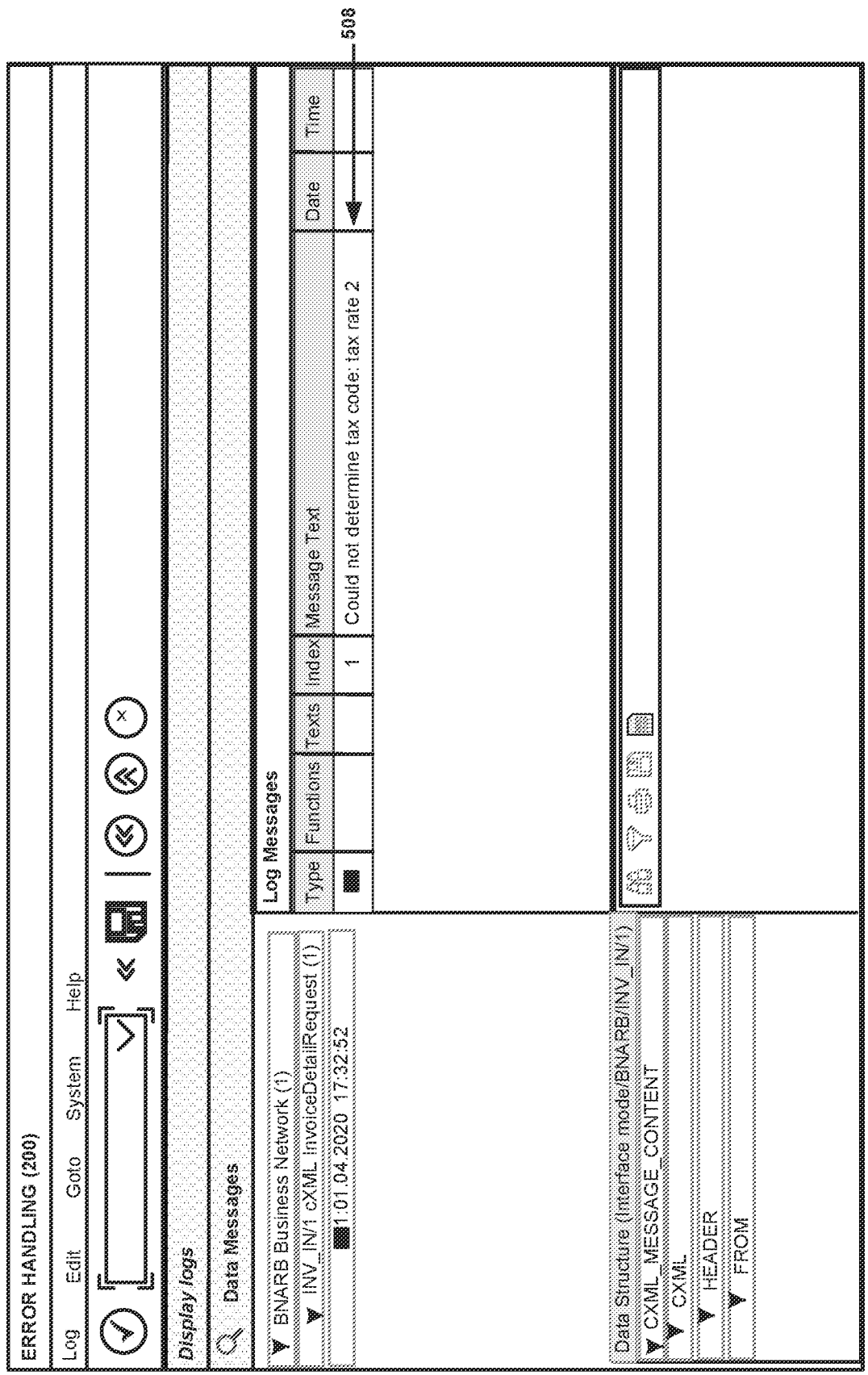

FIG. 5A to FIG. 5F in combination illustrates screenshots of applications corresponding to the use case explained in FIG. 4, according to one embodiment. The flow of business process is described below. With reference to FIG. 4, 'user X' 410 sends a purchase order document from the sender system 402 to the receiver system 406. The purchase order '430966667' is received at the receiver system 406. Based on the purchase order '430966667', invoice 502 document is generated at the receiver system 406 as shown in FIG. 5A. As a follow-up of the purchase order '430966667' from the suppliers, invoice 502 document is generated at the receiver system 406 with some important values like rate of tax, tax rate type, etc., in the invoice 502 document as shown in FIG. 5B. The invoice 502 document is created by submitting the invoice as shown in FIG. 5B. The generated invoice 502 is sent from the receiver system 406 to the sender system 402. For example, a specific information such as rate of tax was incorrectly entered by the receiver system 406 before receiving by the sender system 402.

Now in the sender system 402 the invoice 502 has appeared in the Application Interface framework (AIF) message monitor application. The invoice 502 has failed at the sender system 402 due to incorrect rate of tax value "2" 504 maintained while the invoice was created in the receiver system 406. The erroneous transaction can be viewed in the log file 508 as shown in FIG. 5C. The worker cloak agent at the sender system 402 parses the logs in AIF message monitor application. As can be seen in the FIG. 4, the intelligent robotic process automation 418 based worker cloak agent 416 fetches the logs from AIF monitor and then calls the intelligent correction rules service 420 in the cloud platform 422. Using the intelligent correction rules service 420, the worker cloak agent 416 determines if a matching intelligent correction rule is available. The matching rule retrieved for the incorrect rate of tax value "2" logged in the AIF monitor shows that the mode of integration error correction is 'S-semi-autonomous', System type is 'sender system', message type is 'E-error', etc.

Figure 5D:
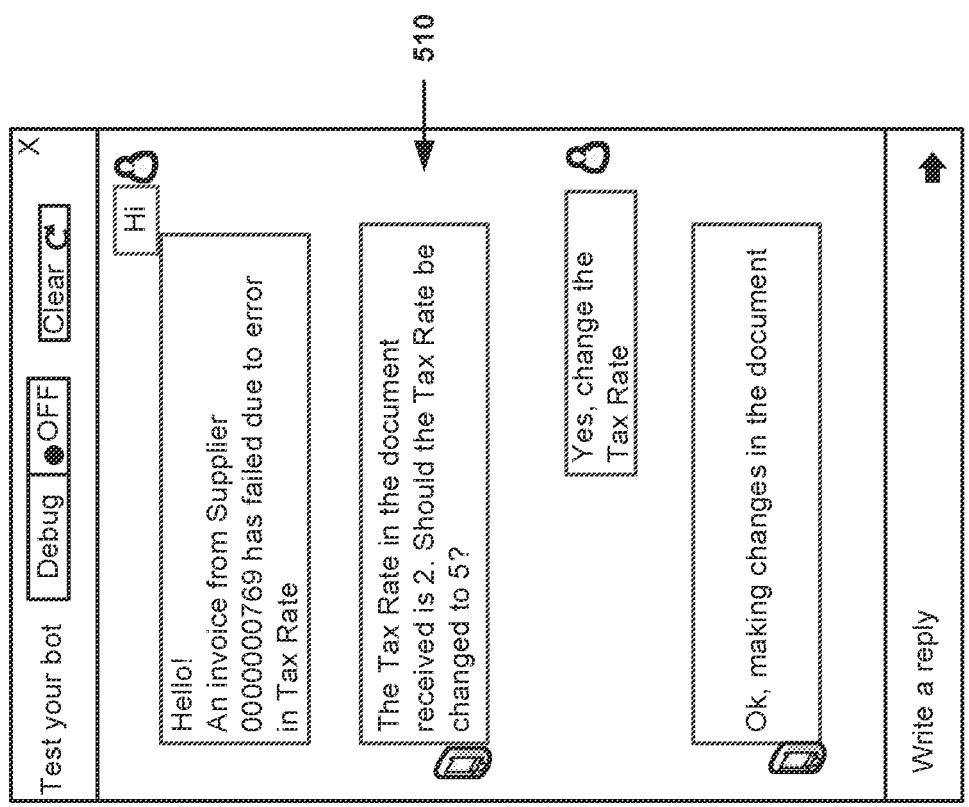
Figure 5E:
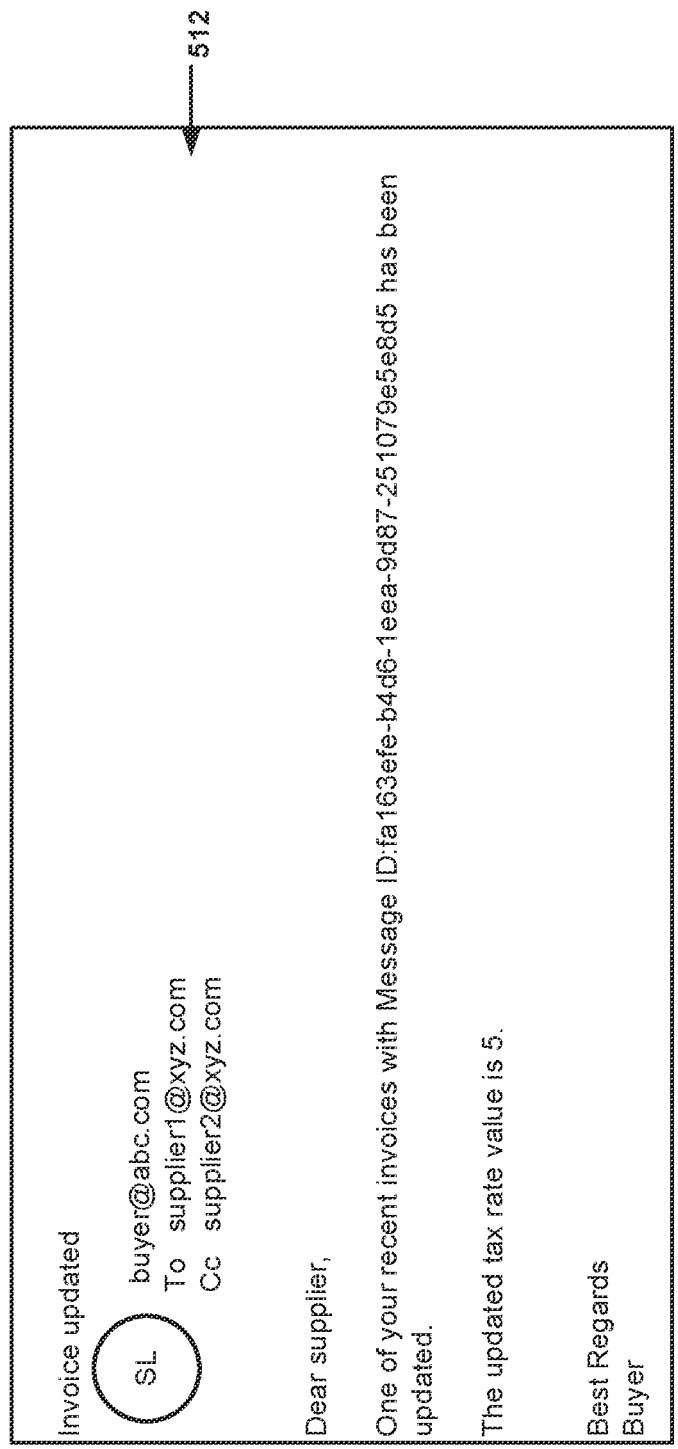

After determining that the mode of integration error correction is 'S-semi-autonomous', the worker cloak agent 416 asks for inputs from 'user Y' 424 or administrator to make changes in the invoice 502 document. As shown in FIG. 5D, the conversational cloak agent asks for inputs whether the rate of tax value can be changed. At 510, the 'user Y' 424 provides approval to the worker cloak agent 416 at the sender system 402 for making the changes to the rate of tax. Since the changes were made by the worker cloak agent 416 at the sender system 402, it is necessary to keep the business user in the receiver system informed that the invoice document has been changed. Hence, the worker cloak agent 416 triggers an email 512 to the business user at the sender system about the correction that was done as shown in FIG. 5E. Once the changes to the invoice document is made, the submission of invoice is re-triggered by the sender system. From the logs shown in FIG. 5F, it can be observed that the invoice was successfully posted in sender system, and an invoice number was generated as shown in 514.

Figure 6:
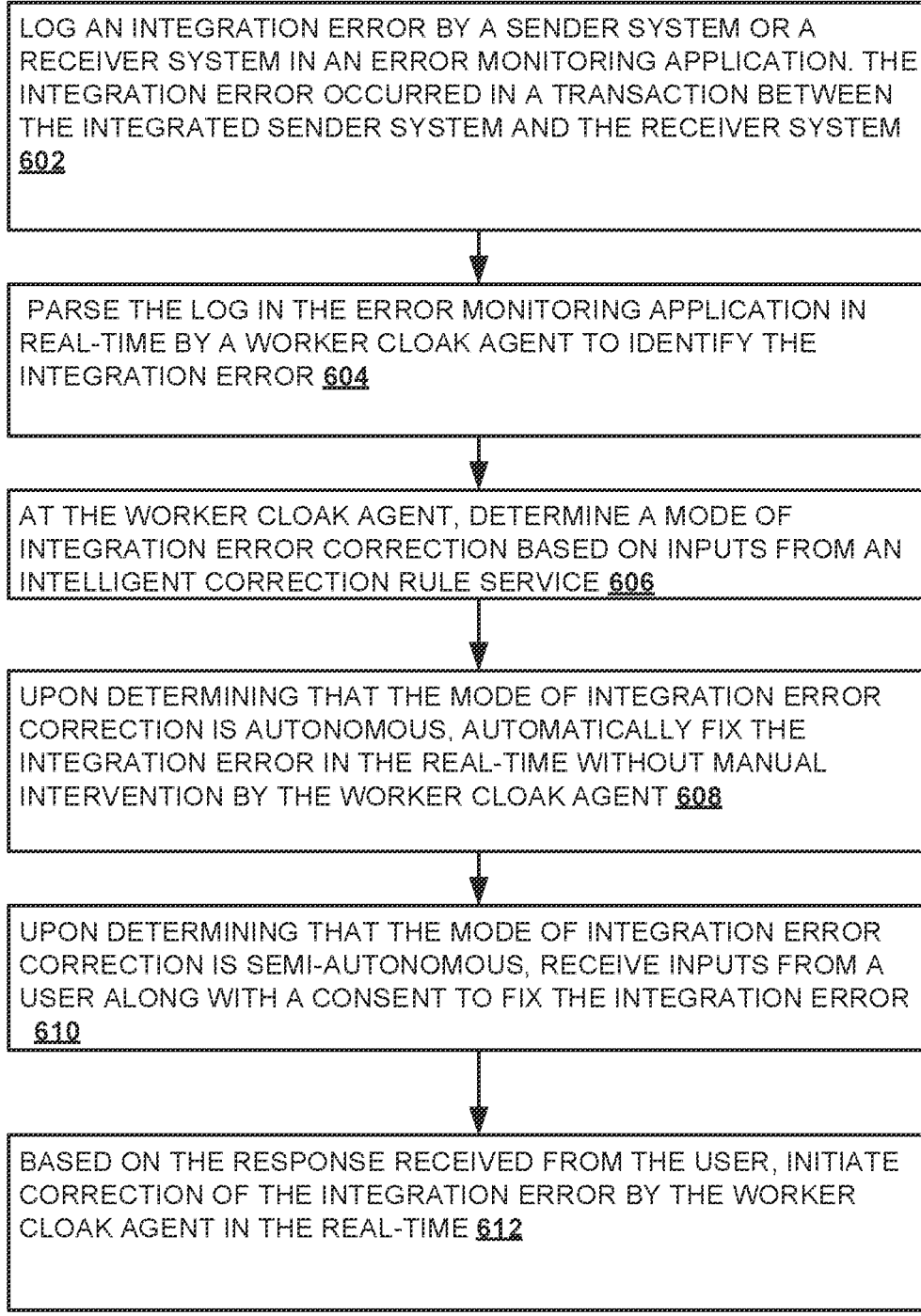
FIG. 6 is flow chart illustrating an intelligent integration error handling in enterprise systems, according to one embodiment.

FIG. 6 is flow chart illustrating an intelligent integration error handling in enterprise systems, according to one embodiment. At 602, an integration error is logged by a sender system or a receiver system in an error monitoring application. The integration error occurred in a transaction between the integrated sender system and the receiver system. At 604, the log in the error monitoring application is parsed in real-time by a worker cloak agent to identify the integration error. At 606, at the worker cloak agent, a mode of integration error correction is determined based on inputs from an intelligent correction rule service. Upon determining that the mode of integration error correction is autonomous, at 608, the integration error is automatically fixed in real-time without manual intervention by the worker cloak agent. Upon determining that the mode of integration error correction is semi-autonomous, at 610, inputs from a business user is received along with a consent to fix the integration error. Based on the response received from the business user, at 612, correction of the integration error is initiated by the worker cloak agent in real-time.

The embodiments described above have the advantages stated below. Most of the enterprise customers have complex integrated system landscape and integration related errors in such customer landscapes can cause the businesses to halt. Cloud based enterprise solutions involve integration of various products, applications, solutions and platforms. The worker cloak agent plays a crucial role in pro-actively correcting integration related errors and to ensure business continuity. As illustrated above in various use cases of an integration scenario between the enterprise applications such as a sending application and a receiving application, could be extended to support several other integration scenarios like in central procurement, ERP, Database management, analytics, CRM, platform, network and other enterprise solutions.

From a support perspective, around 70% of the customer messages raised for integration related issues point to lack of proper error handling know-how at the customer side. Here, the worker cloak agent offers seamless correction of integration related errors at the customer or partner end without back and forth movement of the integration error resulting in efficient fixing of integration related errors. This also reduces the cost of handling customer messages related to integration, leading to a reduced total cost of ownership and eliminate any turnaround time that otherwise would have occurred. The worker cloak agent enables the IT administrator to ensure business continuity between multiple enterprise application by improving the efficiency of handling integration errors.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
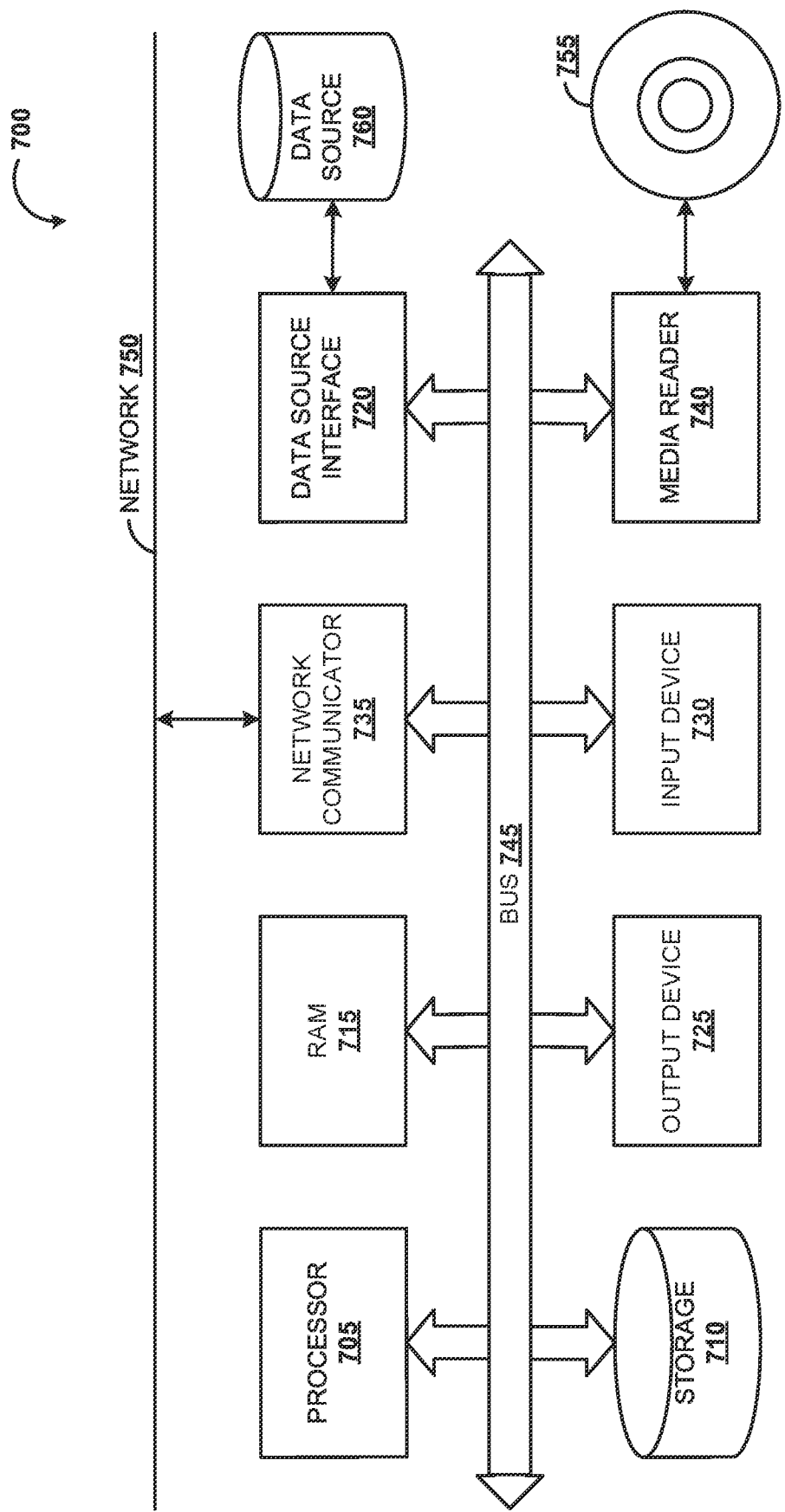
FIG. 7 is a block diagram of an exemplary computer system, according to one embodiment.

FIG. 7 is a block diagram of an exemplary computer system 700. The computer system 700 includes a processor 705 that executes software instructions or code stored on a computer readable storage medium 755 to perform the above-illustrated methods. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object-oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
- log an integration error by a sender system or a receiver system in an error monitoring application, wherein the integration error occurred in a transaction between the integrated sender system and the receiver system;
- parse the log in the error monitoring application in real-time by a worker cloak agent to identify the integration error, wherein the worker cloak agent is a robotic process automation bot;
- at the worker cloak agent, determine a mode of integration error correction based on inputs from an intelligent correction rule service;
- upon determining that the mode of integration error correction is autonomous, automatically fix the integration error in real-time without manual interventions;
- invoke the intelligent correction rule service by the worker cloak agent;
- parse a decision table to identify an intelligent correction rule that matches the integration error;
- return the matched intelligent correction rule to the worker cloak agent to fix the integration error in real-time; and
- upon determining that the matching intelligent correction rule is not identified, predict a new intelligent correction rule from the decision table, wherein the new intelligent correction rule is similar to one of an intelligent correction rule in the decision table.

2. The computer-readable medium of claim 1, further comprises instructions which when executed by the computer further cause the computer to:
- upon determining that the mode of integration error correction is semi-autonomous, receive inputs from a business user along with a consent to fix the integration error; and
- based on a response received from the business user, initiate correction of the integration error by the worker cloak agent in real-time.

3. The computer-readable medium of claim 1, wherein the identified intelligent correction rule includes an error message, an error system type, an error message type, the mode of integration error correction, a correction system type, a correction mechanism, and a correction field, wherein the correction system type indicates a pre-configured preferred system.

4. The computer-readable medium of claim 2, further comprises instructions which when executed by the computer further cause the computer to:
- automatically notify the business user of the sender system where the correction of the integration error is performed at the receiver system.

5. The computer-readable medium of claim 4, further comprises instructions which when executed by the computer further cause the computer to:
- upon determining that the inputs or the consent is not received from the business user, hold fixing of the integration error until the inputs are received from the business user;
- upon receiving the inputs from the business user along with the consent to fix the integration error, initiate correction of the integration error in real-time; and
- re-trigger the transaction between the integrated sender system and the receiver system.

6. A computer-implemented method of intelligent integration error handling in enterprise systems, the method comprising:
- logging an integration error by a sender system or a receiver system in an error monitoring application, wherein the integration error occurred in a transaction between the integrated sender system and the receiver system;
- parsing the log in the error monitoring application in real-time by a worker cloak agent to identify the integration error;
- at the worker cloak agent, determining a mode of integration error correction based on inputs from an intelligent correction rule service;
- upon determining that the mode of integration error correction is autonomous, automatically fixing the integration error in real-time without manual intervention by the worker cloak agent;
- invoking the intelligent correction rule service by the worker cloak agent;
- parsing the log in the error monitoring application in real-time by a worker cloak agent to identify the integration error, wherein the worker cloak agent is a robotic process automation bot;
- returning the matched intelligent correction rule to the worker cloak agent to fix the integration error in real time; and
- upon determining that the matching intelligent correction rule is not identified, predicting a new intelligent correction rule from the decision table, wherein the new intelligent correction rule is similar to one of an intelligent correction rule in the decision table.

7. The method of claim 6, further comprising:
- upon determining that the mode of integration error correction is semi-autonomous, receiving inputs from a business user along with a consent to fix the integration error; and
- based on a response received from the business user, initiating correction of the integration error by the worker cloak agent in real-time.

8. The method of claim 6, wherein the identified intelligent correction rule includes an error message, an error system type, an error message type, the mode of integration error correction, a correction system type, a correction mechanism, and a correction field, wherein the correction system type indicates a pre-configured preferred system.

9. The method of claim 7, further comprising:
- notifying the business user of the sender system or the receiver system where the correction of the integration error is performed at the receiver system.

10. The method of claim 9, further comprising:
- upon determining that the inputs or the consent is not received from the business user, holding fixing of the integration error until the inputs are received from the business user;
- upon receiving the inputs from the business user along with the consent to fix the integration error, initiating correction of the integration error in real-time; and
- re-triggering the transaction between the integrated sender system and the receiver system.

11. A computer system for intelligent integration error handling in enterprise systems, comprising:

a computer memory to store program code; and a processor to execute the program code to:

log an integration error by a sender system or a receiver system in an error monitoring application, wherein the integration error occurred in a transaction between the integrated sender system and the receiver system;

parse the log in the error monitoring application in real-time by a worker cloak agent to identify the integration error, wherein the worker cloak agent is a robotic process automation bot;

at the worker cloak agent, determine a mode of integration error correction based on inputs from an intelligent correction rule service;

upon determining that the mode of integration error correction is autonomous, automatically fix the integration error in real-time without manual intervention;

invoke the intelligent correction rule service by the worker cloak agent;

parse a decision table to identify an intelligent correction rule that matches the integration error;

return the matched intelligent correction rule to the worker cloak agent to fix the integration error in real-time; and upon determining that the matching intelligent correction rule is not identified, predict a new intelligent correction rule from the decision table, wherein the new intelligent correction rule is similar to one of an intelligent correction rule in the decision table.

12. The system of claim 11, further comprising:

upon determining that the mode of integration error correction is semi-autonomous, receive inputs from a business user along with a consent to fix the integration error; and based on a response received from the business user, initiate correction of the integration error by the worker cloak agent in real-time.

13. The system of claim 11, wherein the identified intelligent correction rule includes an error message, an error system type, an error message type, the mode of integration error correction, a correction system type, a correction mechanism, and a correction field, wherein the correction system type indicates a pre-configured preferred system.

14. The system of claim 12, further comprising:

notify the business user of the sender system and receiver system where the correction of the integration error is performed at the receiver system.

* * * * *